(12) United States Patent
Donohue

(10) Patent No.: US 9,951,553 B2
(45) Date of Patent: Apr. 24, 2018

(54) HIGH SPEED PARALLEL PROCESS INSULATED GLASS MANUFACTURING LINE

(71) Applicant: Erdman Automation Corporation, Princeton, MN (US)

(72) Inventor: Morgan Donohue, Mendota Heights, MN (US)

(73) Assignee: Erdman Automation Corporation, Princeton, MN (US)

( * ) Notice: Subject to any disclaimer, the term of this patent is extended or adjusted under 35 U.S.C. 154(b) by 839 days.

(21) Appl. No.: 14/474,865

(22) Filed: Sep. 2, 2014

(65) Prior Publication Data

US 2015/0354266 A1    Dec. 10, 2015

Related U.S. Application Data

(60) Provisional application No. 62/008,269, filed on Jun. 5, 2014.

(51) Int. Cl.
*E06B 3/673*    (2006.01)
*C03C 27/10*    (2006.01)

(52) U.S. Cl.
CPC .......... *E06B 3/67326* (2013.01); *C03C 27/10* (2013.01); *E06B 3/6733* (2013.01); *E06B 3/67382* (2013.01); *E06B 3/67391* (2013.01); *Y10T 156/1751* (2015.01)

(58) Field of Classification Search
CPC ............... E06B 3/67326; E06B 3/6733; E06B 3/67382; E06B 3/67391
See application file for complete search history.

(56) References Cited

U.S. PATENT DOCUMENTS

| 4,369,084 | A | 1/1983 | Lisec |
| 4,406,726 | A | 9/1983 | Lisec |
| 4,422,541 | A | 12/1983 | Lisec |
| 4,434,024 | A | 2/1984 | Lisec |
| 4,615,431 | A | 10/1986 | Lisec |
| 4,886,095 | A | 12/1989 | Lisec |
| 4,921,022 | A | 5/1990 | Lisec |
| 5,110,337 | A | 5/1992 | Lisec |
| 5,173,148 | A | 12/1992 | Lisec |
| 5,280,832 | A | 1/1994 | Lisec |

(Continued)

*Primary Examiner* — Christopher T Schatz
(74) *Attorney, Agent, or Firm* — Patterson Thuente Pedersen, P.A.

(57) ABSTRACT

A high speed parallel manufacturing line for manufacturing insulated glass units, the manufacturing line including a front conveyor system, a back conveyor system, a shuttle mechanism that distributes glass lites to the front conveyor system and the back conveyor system, an insulated glass unit spacer applicator having a spacer dispensing head configured to apply perimeter spacer material to one of the glass lites, the spacer head being proportionally movable relative to the glass lite as the glass lite is conveyed on the front conveyor mechanism to apply the perimeter spacer material to create a spacer applied lite and a gas press. A secondary edge sealing unit has a first secondary edge sealing head and a second secondary edge sealing head, each of the first secondary edge sealing head and the second secondary edge sealing head applying edge sealant to portion of a perimeter of an insulated glass unit.

13 Claims, 15 Drawing Sheets

(56) References Cited

U.S. PATENT DOCUMENTS

| | | | |
|---|---|---|---|
| 5,413,156 A | 5/1995 | Lisec | |
| 5,476,124 A | 12/1995 | Lisec | |
| 5,542,805 A | 8/1996 | Lisec | |
| 5,626,712 A | 5/1997 | Lisec | |
| 5,645,678 A | 7/1997 | Lisec | |
| 5,676,782 A | 10/1997 | Lisec | |
| 5,685,437 A | 11/1997 | Lisec | |
| 5,704,405 A | 1/1998 | Lisec | |
| 5,815,273 A | 9/1998 | Lisec | |
| 5,823,732 A | 10/1998 | Lisec | |
| 5,878,866 A | 3/1999 | Lisec | |
| 5,888,341 A * | 3/1999 | Lafond | E06B 3/6733 156/101 |
| 5,932,062 A * | 8/1999 | Manser | B05C 5/0216 118/669 |
| 6,077,018 A | 6/2000 | Lisec | |
| 6,192,711 B1 | 2/2001 | Lisec | |
| 6,197,231 B1 | 3/2001 | Lisec | |
| 6,245,145 B1 | 6/2001 | Lisec | |
| 6,491,966 B1 | 12/2002 | Lisec | |
| 6,609,611 B1 | 8/2003 | Lenhardt | |
| 7,008,492 B2 | 3/2006 | Lisec | |
| 7,207,250 B2 | 4/2007 | Lisec | |
| 7,252,188 B2 | 8/2007 | Lisec | |
| 7,402,096 B2 | 7/2008 | Lisec | |
| 7,690,870 B2 | 4/2010 | Lisec | |
| 7,713,600 B2 | 5/2010 | Lisec | |
| 7,807,003 B2 | 10/2010 | Schuler | |
| 7,938,924 B2 | 5/2011 | Lisec | |
| 8,114,232 B2 | 2/2012 | Lisec | |
| 8,480,940 B2 | 7/2013 | Schuler | |
| 8,622,110 B2 | 1/2014 | Lisec | |
| 2003/0178127 A1 | 9/2003 | Lisec | |
| 2004/0232188 A1 | 11/2004 | Lisec | |
| 2004/0237737 A1 | 12/2004 | Lisec | |
| 2005/0011229 A1 | 1/2005 | Lisec | |
| 2005/0247392 A1 | 11/2005 | Lisec | |
| 2006/0076110 A1 | 4/2006 | Lisec | |
| 2006/0180140 A1 | 8/2006 | Lisec | |
| 2006/0201606 A1 | 9/2006 | Lisec | |
| 2007/0131338 A1 | 6/2007 | Lisec | |
| 2007/0158381 A1 | 7/2007 | Lisec | |
| 2007/0275192 A1 | 11/2007 | Lisec | |
| 2010/0200164 A1 | 8/2010 | Lisec | |
| 2012/0037293 A1 | 2/2012 | Mader et al. | |
| 2012/0085499 A1 | 4/2012 | Mader et al. | |
| 2012/0094040 A1 | 4/2012 | Mader | |
| 2012/0199272 A1 | 8/2012 | Mader | |
| 2012/0230759 A1 | 9/2012 | Mader | |
| 2012/0261056 A1 | 10/2012 | Mader | |
| 2012/0285605 A1* | 11/2012 | Ripoche | E06B 3/6775 156/109 |
| 2013/0040541 A1 | 2/2013 | Mader et al. | |
| 2013/0099047 A1 | 4/2013 | Mader | |
| 2015/0184447 A1* | 7/2015 | Queck | E06B 3/67326 29/430 |

* cited by examiner

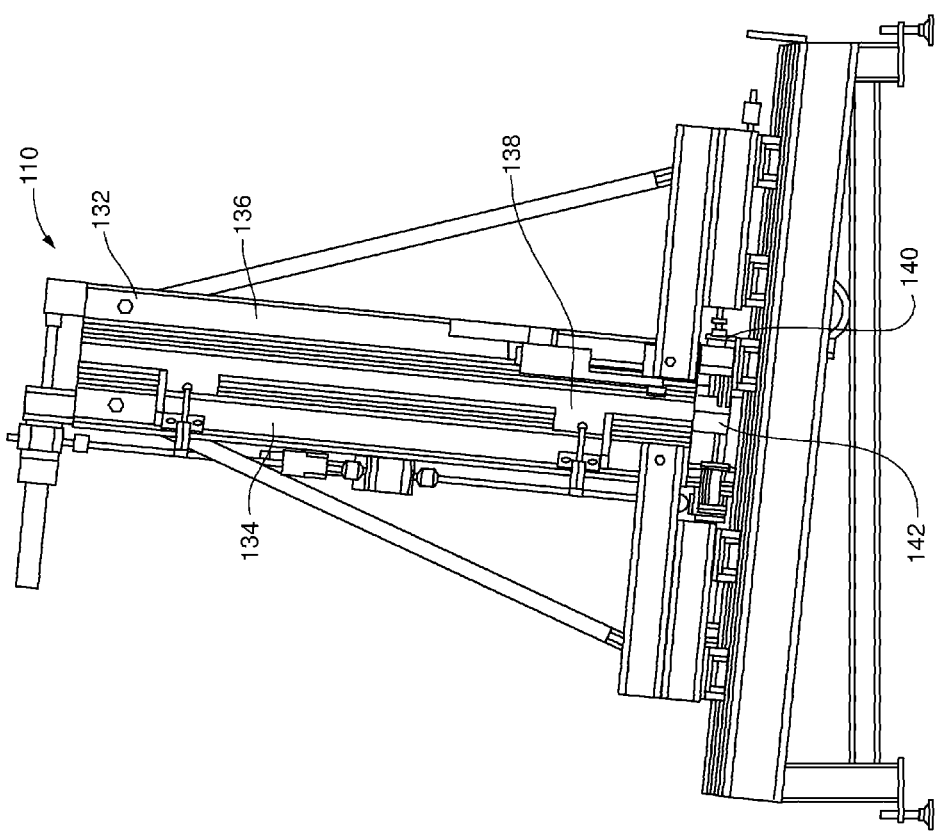

HIGH SPEED PARALLEL PROCESS INSULATED GLASS MANUFACTURING LINE

RELATED APPLICATION

This application claims the benefit of U.S. Provisional Application 62/008,269 filed Jun. 5, 2014 entitled "High Speed Parallel Process Insulated Glass Manufacturing Line" which is incorporated herein in its entirety by reference.

FIELD OF THE INVENTION

The invention relates to production of insulated glass units.

BACKGROUND

Insulated glass is heavily utilized in modern residential and commercial construction. In many areas of the country it is required by building code as an energy conservation measure. A single pane of glass alone has very little insulating value. Multi-pane insulated glass windows have much greater insulating value. Insulated glass units generally include at least two panes of glass having identical shapes. Sealants and adhesives are used to bond the glass panes to a perimeter spacer which separates the two panes of glass. The entire perimeter including the two panes of glass and the spacer are sealed to one another to eliminate movement of ambient air into the space between the two panes of glass.

The space is filled with dehydrated air or more commonly another gas such as argon, xenon or krypton. Sulfur hexafluoride is also used for gas filling. The filling of insulated glass units with argon or another gas that is not air has been found to increase the energy efficiency of the insulated glass units markedly. Some insulated glass units includes three panes of glass with two intervening spaces which are similarly filled with argon or another gas other than air and then edge sealed.

The spacer in an insulated glass unit is inset from the peripheral edges of the glass panes leading to a trough shaped space bounded on two sides by the glass panes and on one side by the spacer. In the manufacturing of insulating glass units, this space is filled with an adhesive sealant which forms the, so called, secondary seal of the insulated glass unit. The secondary seal may be applied using a variety of different adhesive sealants. These include time setting sealants, such as silicones or butyl rubber sealants. Sometimes two part sealants utilizing a resin and a catalyst to polymerize the resin are utilized. More commonly in modern manufacturing, hot melt adhesive sealants are used. Hot melt adhesive sealants are general applied in a liquid state at a temperature of approximately 350° F. and harden upon cooling to ambient temperature.

In high volume manufacturing facilities, the secondary seal is commonly applied by fully automated equipment in which a computer controlled robotic sealant applying head is moved around the peripheral edges of the insulated glass unit under computer control and applies the sealant to the edge or edges of the insulated glass unit. Fully automated secondary edge sealing equipment of this sort can apply the secondary seal to very large numbers of insulating glass units in a production run. Typically, the insulated glass units in these circumstances are produced in large runs of identical units.

The process of manufacturing insulated glass units generally includes infeed of glass panes or lites into a washing unit that cleans both surfaces of each pane and, in particular, the surface of each pane that will be on the interior of the insulated glass unit. This is particularly important because, once the insulated glass unit is complete the interior surfaces will be inaccessible to cleaning and any visible dirt is impossible to remove. Accordingly, the washing station is generally followed by an inspection station to assure that the panes are clean.

In the prior art, panes or lites are then conveyed in tandem fashion to further processing. The panes are divided into pairs, each pair including a spacer lite to which a peripheral spacer is applied and which forms the back of the IGU and a topping lite which will ultimately be applied on top of the spacer lite and sealed to the spacer to form the insulated glass unit. According to the prior art generally, the topping lite proceeds first in the pair and is followed by the spacer applied lite. When the spacer lite reaches a spacer application station the peripheral spacer is applied. The spacer lite and the topping lite are both advanced so that the topping lite can be removed from the conveyor. According to the prior art, the topping lite is picked up first at the gas press then the spacer applied lite is conveyed in and unit is gas filled and assembled. The primary sealed insulated glass unit is then conveyed to a secondary seal applicator to apply secondary sealant to the edges bordered by the spacer and the peripheral portions of the lites. The completed IGU is then conveyed to the end of the processing line for transport to next steps.

According to the prior art, the heads for application of spacer and sealant are stationary in the X axis and the glass lites or IGUs are moved relative to the fixed heads. Thus the prior art requires that the glass to move though the zone three times. Once for application along bottom x axis moving forward, once across the top x axis moving backward and then removal forward to the next station.

There is a need for application devices in the window industry that can increase the productivity of manufacturing of insulated glass units.

SUMMARY OF THE INVENTION

The high speed parallel process insulating glass manufacturing line according to the embodiments of the invention solves many of the industry demands for higher cycle speed, shorter cycle time and automation of the manufacturing process. According to an example embodiment, the high speed line generally includes an infeed station, a glass washer, an inspection station, a shuttle, a driven parallel infeed conveyor, an insulated glass unit spacer applicator, a following queue station, a grid station followed by a second queue station, a gas filling station, a secondary edge sealer and an outfeed queue station. Embodiments of the invention are expected to permit a cycle time of approximately 15-20 second per unit as compared to the prior art cycle time of 25-30 seconds per unit. This cycle time is expected to be 33 to 50 percent of the prior art cycle time. Thus a doubling of production rate over the prior art is possible.

The infeed station is generally conventional and receives glass panes or lites generally fed to the line one at a time by an operator.

The washer is also generally conventional and according to an example embodiment of the invention, is generally vertically oriented so that lites are washed and dried in a generally vertical orientation. Vertical, in this case means that the lites are held in an orientation within about 25 degrees of true vertical, more typically within 6 to 10 degrees of vertical, for example six degrees from vertical.

The inspection station is also generally conventional and permits inspection of the washed glass for cleanliness and condition.

The shuttle according to an example embodiment of the invention is a double shuttle which distributes lites so that topping lites are in a back conveyor line and spacer applied lites are in a front conveyor line. According to one embodiment of the invention, the double shuttle minimizes shifting when glass lites are distributed to the front and back conveyor line.

Spacer applied lites are those to which a perimeter spacer will be or has been applied in the construction of an insulated glass unit (IGU). Topping lites are those that will be or have been applied to a perimeter spacer that is already joined to a spacer applied lite to form an IGU that is partially completed in that it has been primary sealed but no secondary sealant has been applied. An insulated glass unit (IGU) includes a spacer applied lite joined to a topping lite and a perimeter spacer sealed to both the spacer applied lite joined to a topping lite with air or another gas trapped in between.

The driven parallel infeed conveyor is a queue conveyor and receives glass lites from the shuttle and conveys them to the insulated glass unit spacer applicator. Spacer applied lites are in a front conveyor line while topping lites are in a rear conveyor line. Separate conveying of the topping lites and the spacer applied lites eliminates time wasted conveying the topping lite through the spacer applied lite work areas and may save as much as five seconds of cycle time according to the invention.

The insulated glass unit spacer applicator receives lites from the parallel infeed conveyor and applies spacers to the spacer applied lite on the front conveyor line while conveying the topping lite behind the spacer applied lite. The IGU spacer applicator is structured so that a following spacer applied lite can be staged for the applicator prior to the finishing of the application of the spacer to the first spacer applied lite. Staging the following lite prior to finishing the prior lite saves about three seconds in cycle time.

According to an example embodiment of the invention, the spacer is applied while the lite is moving forward. Thus, the applicator head and glass are conveyed forward simultaneously at the same time that the applicator head is moving relative to the lite and applying the spacer. As compared to the prior art, the spacer applicator according to an embodiment of the invention eliminates backing up of the lite during the application process so that the lite is only moved forward continuously during the process. Applying the spacer while the spacer applied lite is moving a forward direction saves about five second in cycle time over the prior art approach.

According to an embodiment of the invention, the spacer or primary seal is applied to the bottom of the lite then to the trailing edge of the lite, the top edge of the lite and the leading edge of the lite in sequence. This occurs while the lite is moving forward so that the lite never is required to move backward or to stop the manufacturing line. The spacer applicator head moves in the x, y and z axes plus in a rotational fashion.

The spacer applied lite is conveyed through the spacer applicator by a servo-driven suction cup assembly structured to grip the lite and move the lite forward with variable speed while the spacer is applied. According to an example embodiment of the invention, the speed and rate of the servo-driven suction cup assembly are electronically controlled. The servo-driven suction cup assembly displaces the lite forward, in part, to accommodate staging of the following spacer applied lite.

The topping lite and spacer applied lite with spacer now applied exit to the following queue station prior to the optional grid application station.

The driven grid application station is generally conventional in structure and need not be further described here other than the grid application station has two conveyor lanes so the topping lite passes behind rather than through the grid application work zone. This arrangement permits the following spacer applied lite which may require a grid to be staged 5 seconds faster. The grid application station is used to place grids within the spacer of the spacer applied lite. The driven grid application station is optional and can be eliminated if grids are not desired.

The gas press with gas fill may include, according to embodiments of the invention, a single high speed gas press with a shuttle in the press or a double gas press including two gas fill chambers with a shuttle prior to and after the double gas press. As used herein, "gas press" means a device capable of sealing insulating gas between glass lites.

According to an embodiment of the invention, the double gas press includes two gas press compartments including a front gas press compartment and a back gas press compartment. Each of the front gas press compartment and the back gas press compartment include gas ducts and an internal conveyor.

According to one embodiment of the invention, the gas ducts are arranged to dispense gas from either the leading or trailing edge of the unit. The double gas press may include three platens including a front platen, a central platen shared by both compartments and a back platen. As it is operating, the front compartment receives a first topping lite from the back line. The front compartment then transfers the first topping lite from the central platen to the front platen while shuttling the front compartment to the front line. The front compartment receives a first spacer applied lite from the front line which is received on the central platen front side. The front gas press compartment then dispenses gas and mates the first topping lite with the first spacer applied lite creating a primary sealed insulated glass unit. Meanwhile, the back compartment is aligned with a back line and receives a second topping lite from the back line. The back compartment then shuttles to the front line where it receives a second spacer applied lite from the front line. The back compartment platens then move together while dispensing gas to mate the second topping lite with the second spacer applied lite. In sequence, each of the back compartment and the front compartment shuttle to alignment with the back line or the front line to convey the partially completed first and second insulated glass units. Because there are 2 chambers according to this embodiment, each gas fill chamber has 30-40 seconds to convey glass into each chamber, fill the IGU with gas, assemble and convey the assembled IGU out of the gas fill chamber. Accordingly, the production cycle can be maintained at 15-20 seconds. The glass units alternately load and unload each of the gas press chambers during each cycle. This longer time in each chamber allows for higher than average gas fill percentages without slowing production throughput. This represents yet another improvement over traditional lines where high gas fill percentages will slow the line's production.

According to another example embodiment of the invention, a single high speed gas press is used. According to an example embodiment the single high speed gas press generally includes a housing, a front platen with suction grippers, a back platen with suction grippers, side doors, an internal conveyor and gas ducts. According to embodiments of the invention, the gas ducts may be located below or on the leading edge side or the trailing edge side of the housing.

The single high speed gas press shuttles from the back line to the front line. In sequence, it receives a topping lite conveyed from the back line, transfers the topping lite from the back platen to the front platen and meanwhile shuttles to the front line. The single gas press then receives the spacer applied lite from the front line. Side doors of the single gas press close and the internal conveyor moves out of the way. Gas ducts are moved into position at the bottom or side as the internal conveyor is moved out of the way. Gas is then injected and the platens move to mate the topping lite to the spacer applied lite and press them together to establish a primary seal. The internal conveyor then moves back into place and the assembled insulated glass unit is conveyed out at the same time as a following topping lite is conveyed in.

The primary sealed, partially complete insulated glass unit then is conveyed to the secondary edge sealer.

According to an example embodiment of the invention, the secondary edge sealer is a two headed edge sealer. According to an example embodiment, an upper head applies secondary sealant to the leading edge, the top edge and the trailing edge of the insulated glass unit. The lower head applies secondary sealant to the bottom edge of the partially completed insulated glass unit. According to an embodiment of the invention, servo-driven cups grip and transport the insulated glass unit. The servo-driven cups also displace the insulated glass unit forward to permit staging of a following unit while the first unit is being edge sealed. According to an example embodiment of the invention, each of the upper and lower secondary edge sealing heads includes a corner wiper that eliminates or minimizes the need for operator touch-up of the insulating glass unit. This is particularly helpful with the short cycle time of the present invention as the operator is unlikely to have much time to touch-up due to the 15-20 second cycle time of the high speed parallel insulated glass manufacturing line. As compared to the prior art, there is no need for the IGU to be backed up and reconveyed through the secondary sealer. In the prior art, the IGU is generally conveyed through secondary sealer three times in a forward direction and moved in reverse two times. This represents a time savings of about five seconds over the conventional approach.

According to example embodiments of the invention, the two edge sealing heads are mounted on a short move x-gantry. The gantry is capable of moving in the x direction along with the IGU as the IGU is conveyed forward, for example, for about eight inches. This short move forward in the x direction allows for the finishing Y movement of the gantry to be slightly ahead of the starting y move. This allows the next IGU to be staged at the start point prior to the prior unit being completed. This feature saves up to 3 more seconds in cycle time.

According to example embodiments of the invention, secondary sealants are either hot melt sealants or two part sealant that set rapidly to support the short cycle times. More conventional sealants can be utilized as well.

The completed insulated glass units are then conveyed out to a driven or non-driven outfeed queue station where the operator moves the completed insulated glass unit for further processing.

It is to be noted related to this application that the term "parallel" is to be construed broadly and is not limited to "parallel" in the geometric sense of being equidistant at all points unless otherwise noted in the application of claims. Parallel may, for example, refer to two conveyor paths that begin and end at substantially the same locations but take different paths between the beginning and end.

It is expected that the high speed parallel process insulated glass manufacturing line according to an embodiment of the invention will have cycle times of approximately 17-18 seconds for insulated glass units depending upon size. It is possible that the high speed parallel insulated glass manufacturing line will be able to achieve cycle times of approximately 15 seconds per insulated glass unit. This is a significant gain over the prior art known to Applicant", possibly doubling production without adding employees.

BRIEF DESCRIPTION OF THE DRAWINGS

FIG. 15 is an elevational view of a single gas press according to an embodiment of the invention.

DETAILED DESCRIPTION

Figure 1:
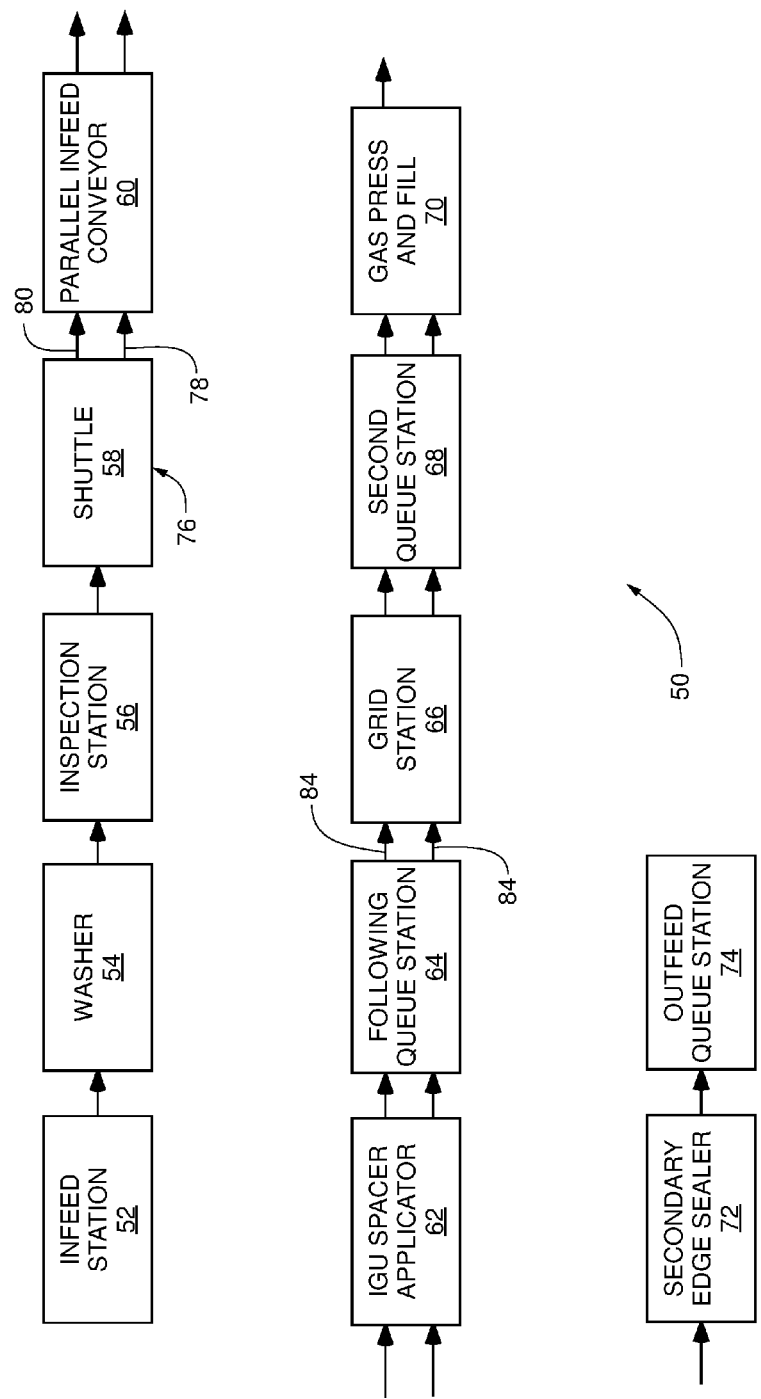
FIG. 1 is a block diagram depicting a high speed parallel process insulating glass manufacturing line according to an example embodiment of the invention.
Figure 2:
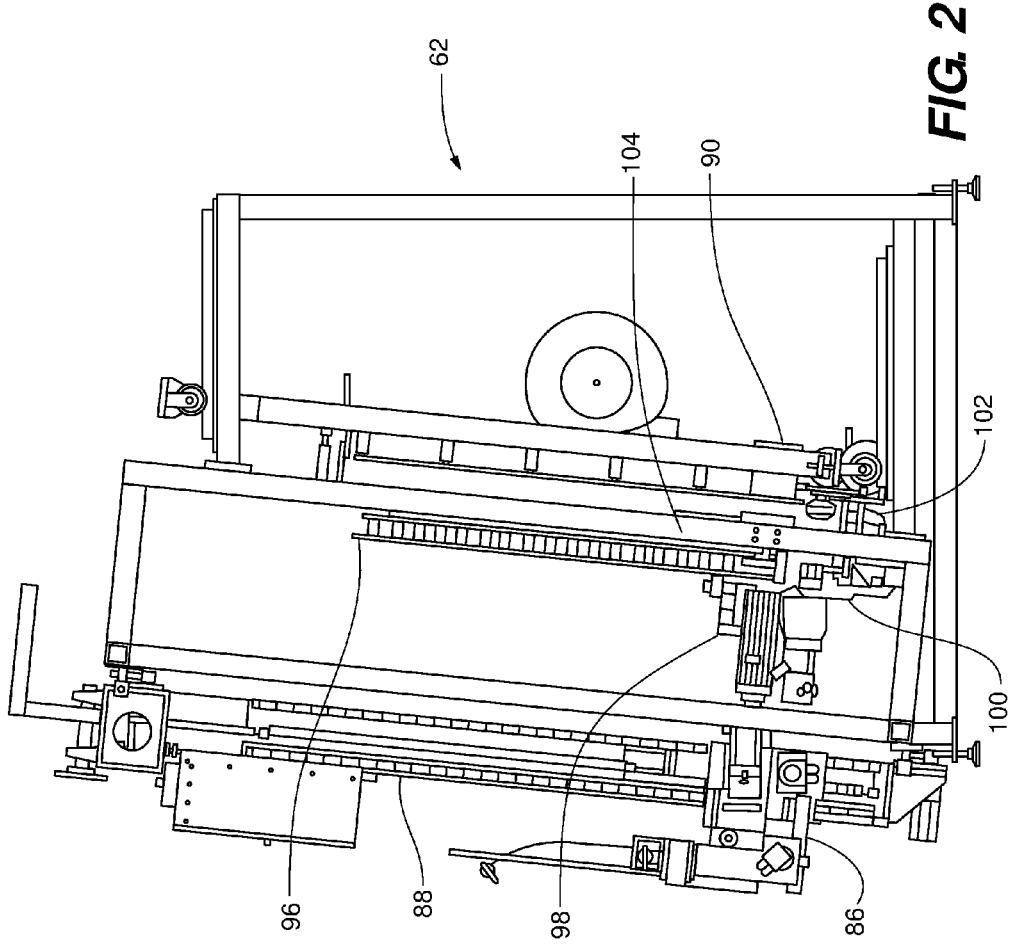
FIG. 2 is an end elevational view of an IGU spacer applicator according to an example embodiment of the invention.
Figure 3:
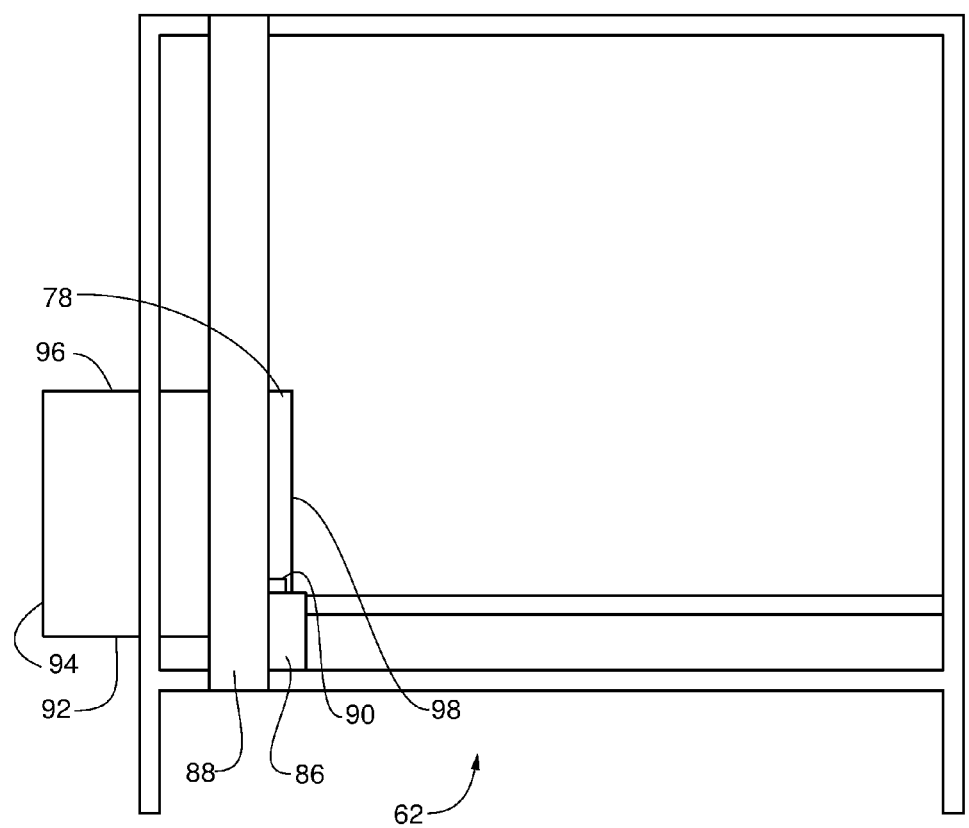
FIG. 3 is a schematic depiction of an IGU spacer applicator at the beginning of spacer application to a spacer applied lite.

Referring to FIG. 1 according to an example embodiment of the invention, high speed parallel process insulating glass manufacturing line 50 generally includes infeed station 52, washer 54, inspection station 56, shuttle 58, driven parallel infeed conveyor 60, IGU spacer applicator 62, following queue station 64, driven grid station 66, second queue station 68, gas press and fill station 70, secondary edge sealer 72, and non-driven outfeed queue station 74. This example embodiment may include elements that are optional as will be discussed herein. However, the elements of the invention are to be defined by the claims appended hereto.

Infeed station 52 is generally conventional in design and known to those skilled in the art and need not be further described.

Washer 54 is general conventional in design and need not be described further herein. Washers 54 are known to those skilled in the art and are available from a number of manufacturers. Washer 54 however, is a glass lite or pane washer that operates with the lite in a generally vertical orientation.

Inspection station 56 is generally conventional in design and need not be further described herein.

Shuttle 58 according to an example embodiment of the invention includes double shuttle mechanism 76. Double shuttle mechanism 76 travels back and forth and divides incoming lites from infeed station 52, washer 54 and inspection station 56 into spacer applied lites 78 and topping lites 80. According to an example embodiment of the invention, spacer applied lites 78 are directed to front conveyor line 82 while topping lites 80 are directed to rear conveyor line 84. For the purposes of discussion of the invention, while spacer applied lite 78 and topping lite 80 may be identical or similar pieces of glass, spacer applied lite 78 refers to lites to which a perimeter spacer has been or will be applied during the manufacturing process while topping lite 80 refers to lites that will be applied on top of the spacer applied lite and perimeter spacer to create a partially assembled insulated glass unit.

Front conveyor line 82 generally transports spacer applied lites 78. Front conveyor line 82 extends generally from shuttle 58 to gas press and fill station 74. This should not be considered limiting as depending upon the exact design of high speed parallel manufacturing line 50 according to example embodiments of the invention, this extent may vary. Rear conveyor line 84 generally transports topping lites 80 and, similar to front conveyor line 82, in an example embodiment, extends generally from shuttle 58 to gas press and fill station 74.

Driven parallel infeed conveyor 60 is generally conventional in design and known to those skilled in the art and need not be further described here. Driven parallel infeed conveyor 60 includes front conveyor line 82 and rear conveyor line 84 upon which spacer applied lite 78 and topping lite 80 are conveyed.

Referring to FIGS. 2-8, IGU spacer applicator 62 generally includes applicator head 86, applicator gantry 88 and servo driven cup 90. Front conveyor line 82 upon which spacer applied lite 78 is transported is accessible to applicator head 86. Rear conveyor line 84 transports topping lites through IGU spacer applicator 62 to the rear.

Applicator head 86 is supported by applicator gantry 88 and applicator head 86, in combination with applicator gantry 88, is capable of translation in x, y and z axes. Applicator head 86 is generally also capable of rotational movement about the z axis to facilitate application of spacers to spacer applied lite 78.

Figure 4:
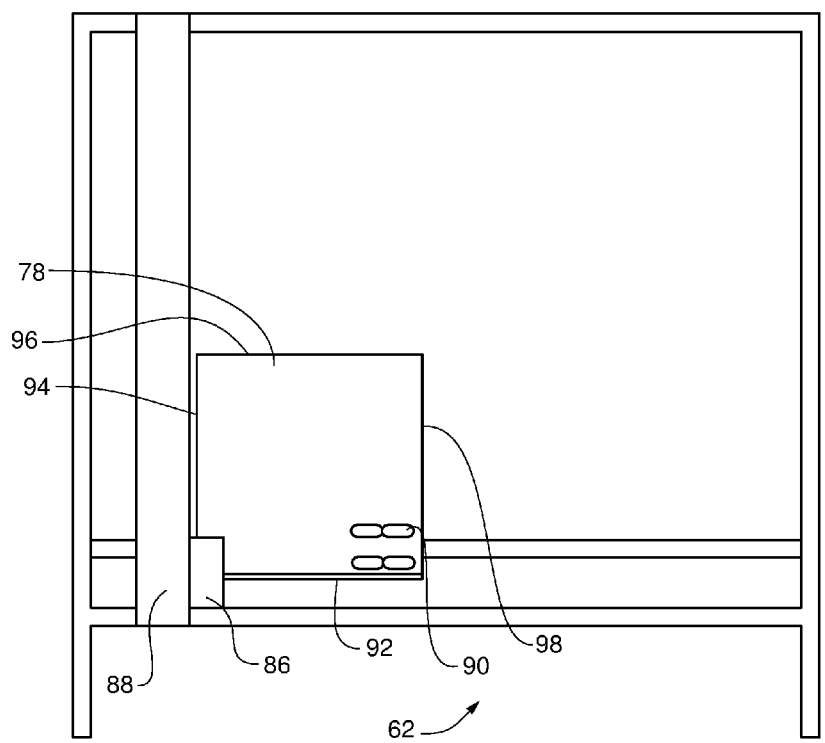
FIG. 4 is a schematic depiction of an IGU spacer applicator during spacer application to a spacer applied lite bottom edge.
Figure 5:
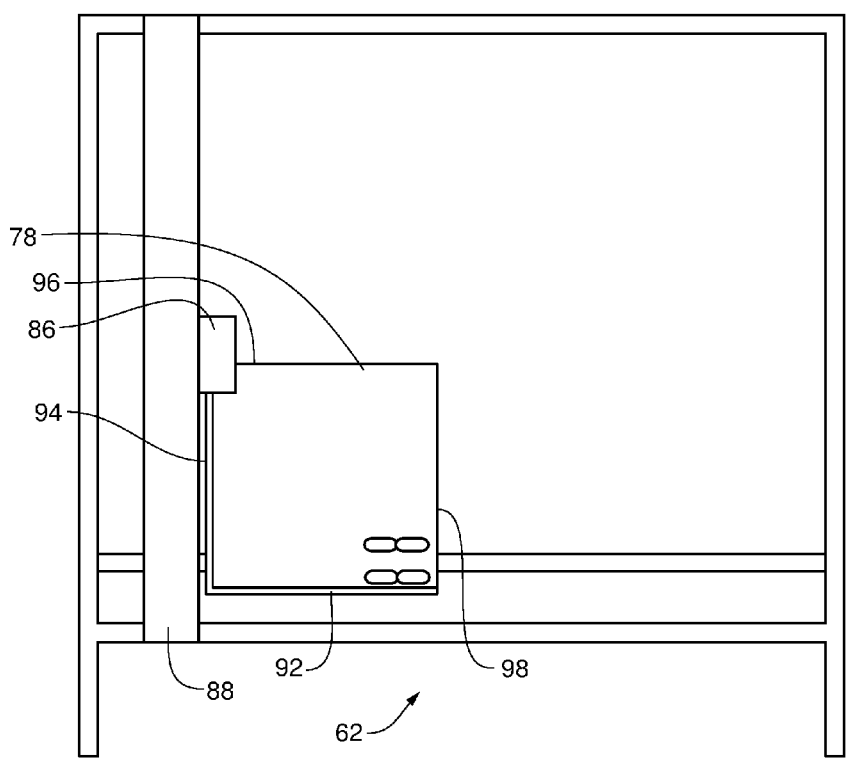
FIG. 5 is a schematic depiction of an IGU spacer applicator during spacer application to a spacer applied lite trailing edge.
Figure 6:
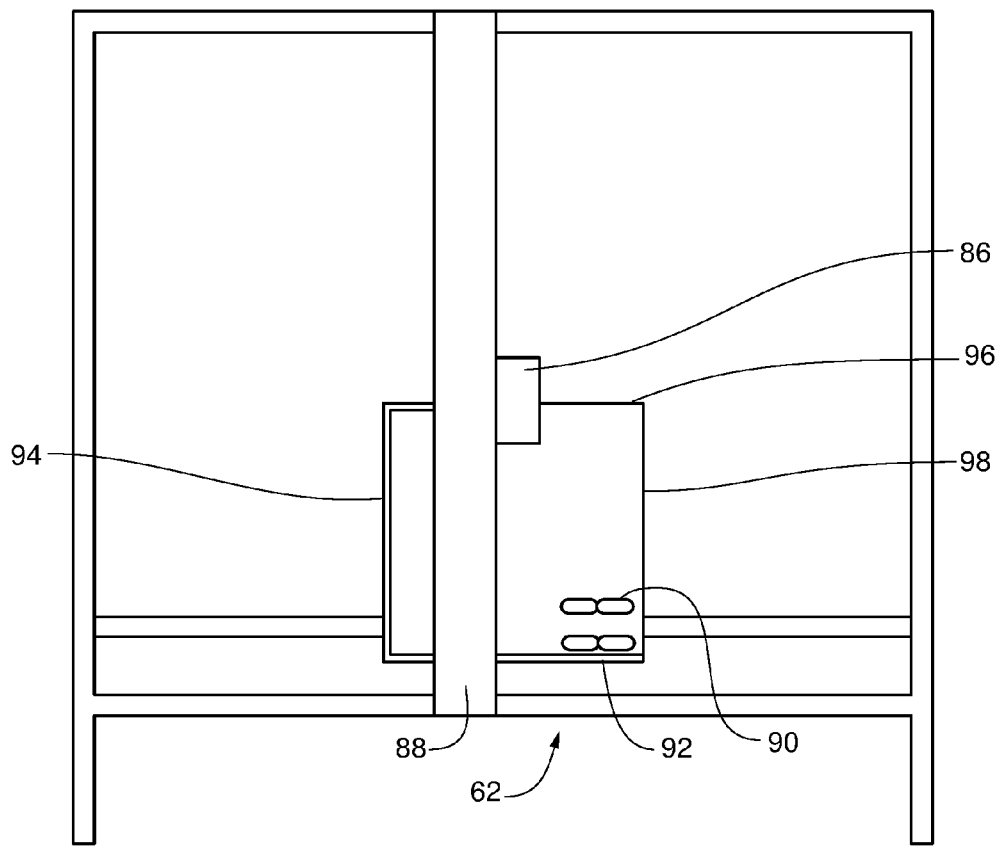
FIG. 6 is a schematic depiction of an IGU spacer applicator beginning spacer application to a spacer applied lite top edge.
Figure 7:
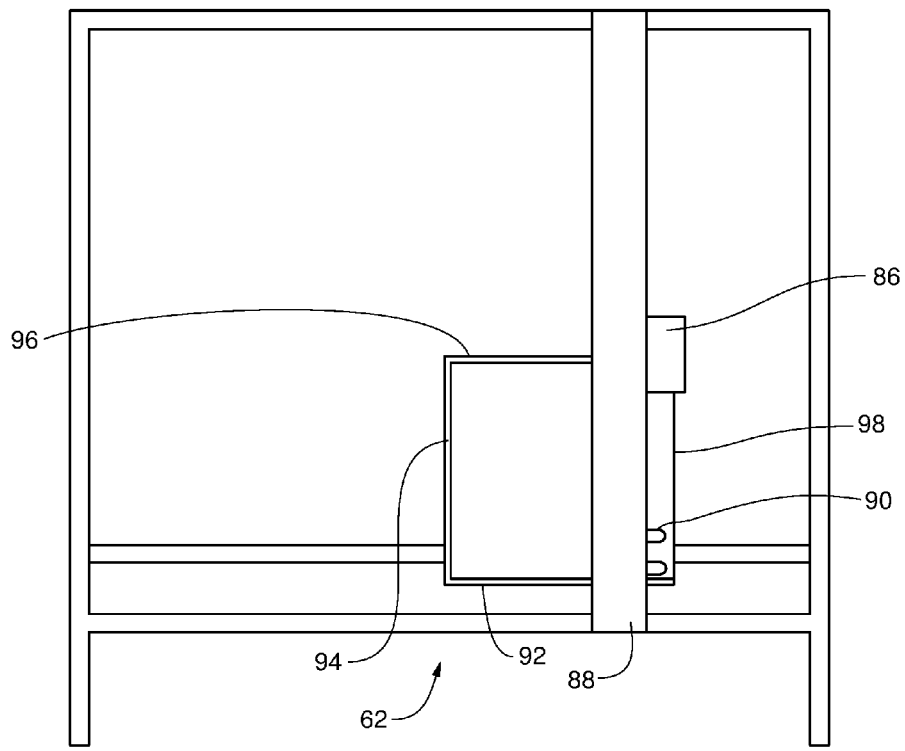
FIG. 7 is a schematic depiction of an IGU spacer applicator continuing spacer application to a spacer applied lite top edge.
Figure 8:
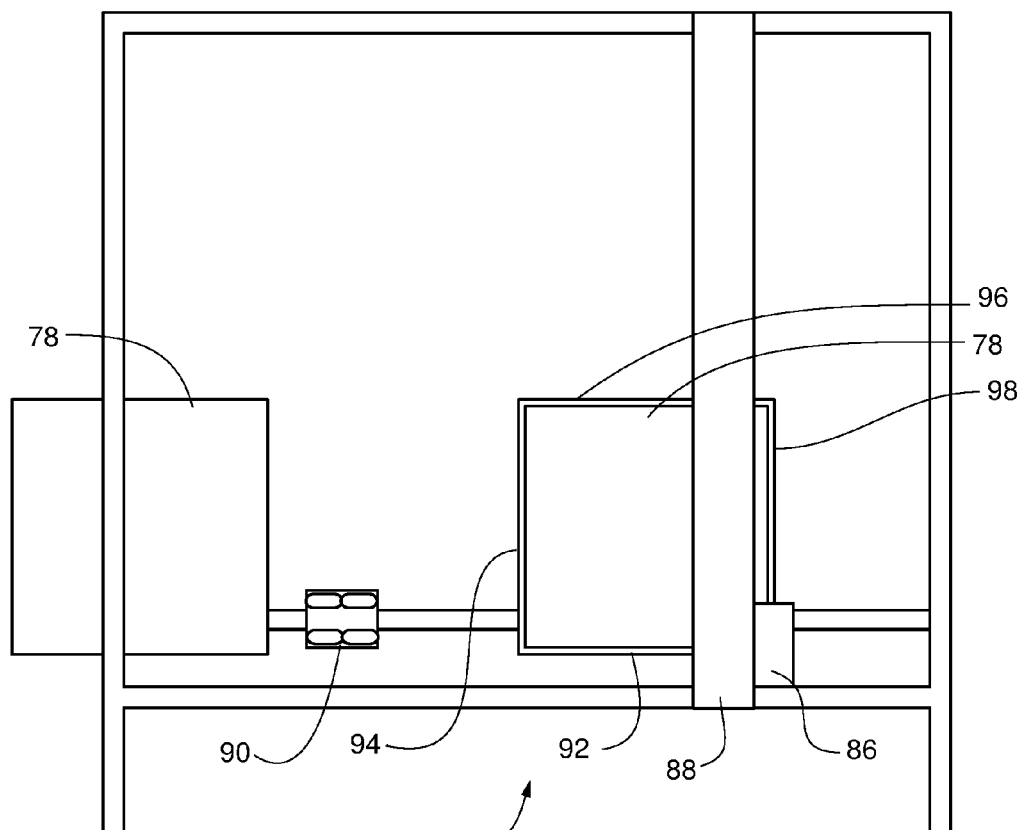
FIG. 8 is a schematic depiction of an IGU spacer applicator during spacer application to a spacer applied lite leading edge.
Figure 9:
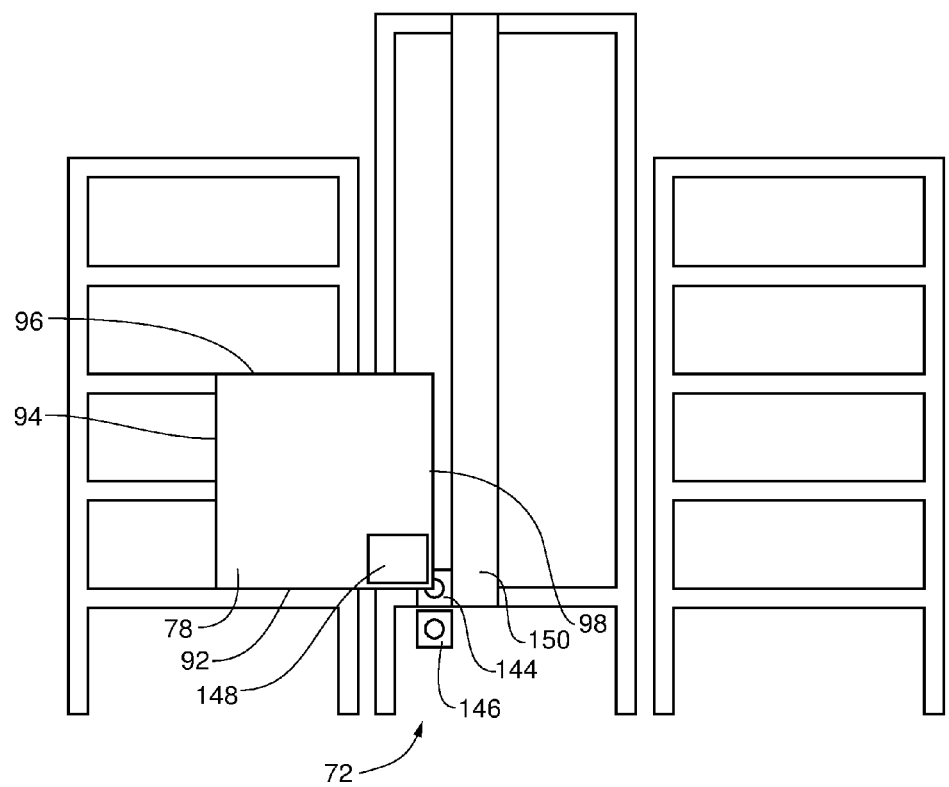
FIG. 9 is a schematic depiction of a dual head IGU secondary sealer at the initiation of an IGU sealing sequence.
Figure 10:
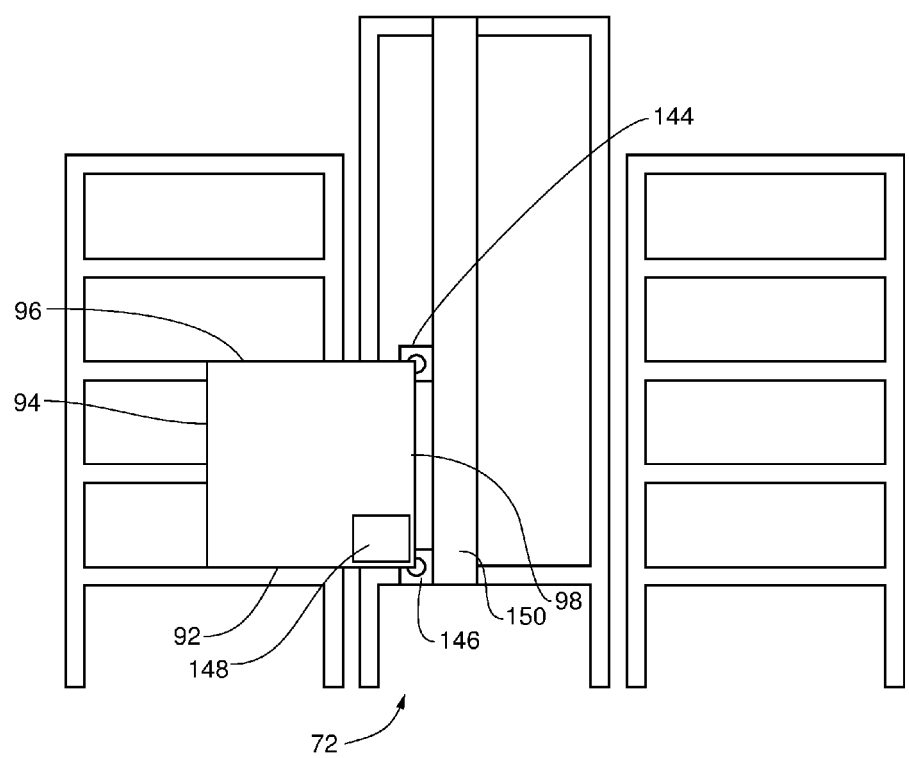
FIG. 10 is a schematic depiction of a dual head IGU secondary sealer as a first sealing head applies secondary sealant to a leading edge of an insulated glass unit and a second sealing head engages the bottom edge of the insulated glass unit.
Figure 11:
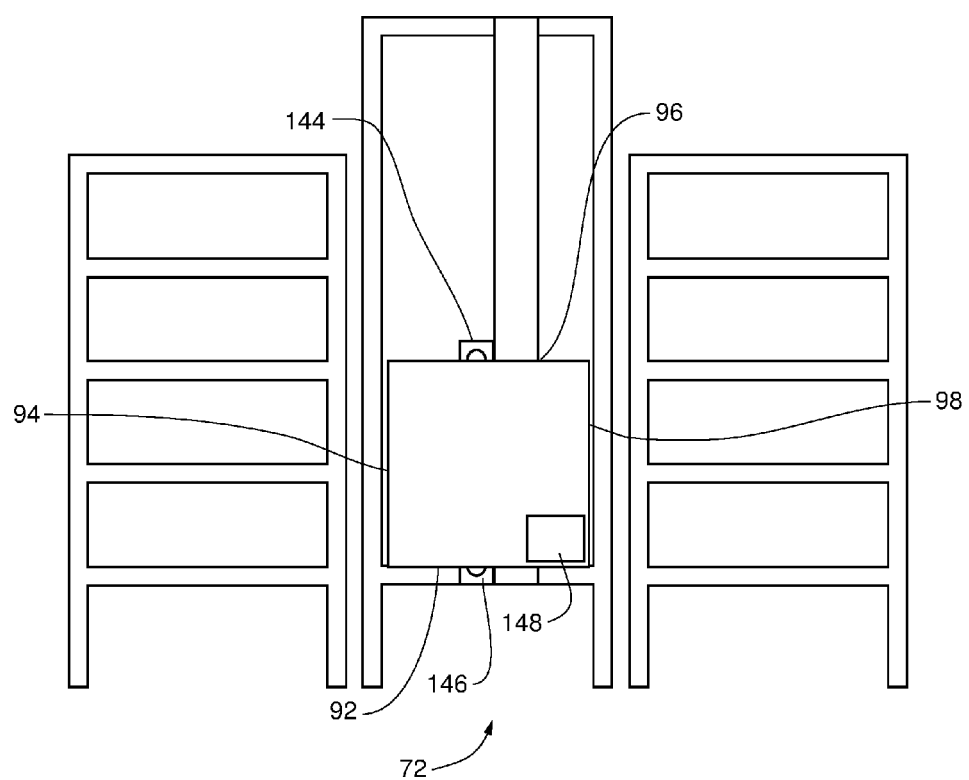
FIG. 11 is a schematic depiction of a dual head IGU secondary sealer as a first sealing head applies secondary sealant to a top edge of an insulated glass unit and a second sealing head applies sealant to the bottom edge of the insulated glass unit.
Figure 12:
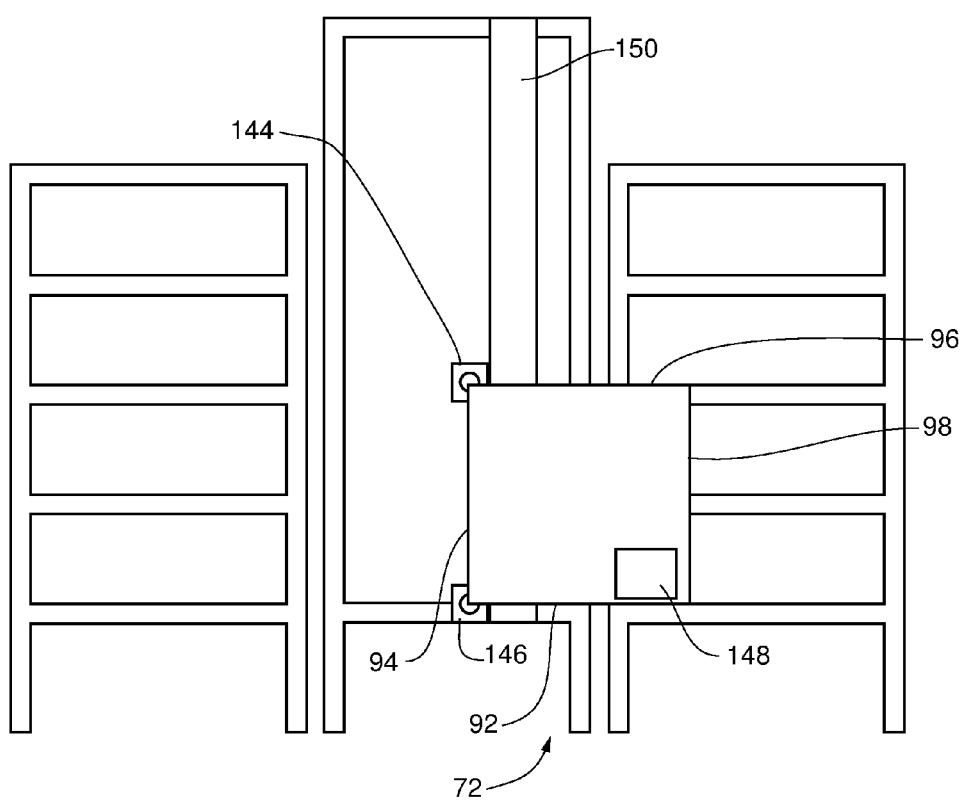
FIG. 12 is a schematic depiction of a dual head IGU secondary sealer as the first sealing head completes application of secondary sealant to a top edge of an insulated glass unit and the second sealing head completes application of sealant to the bottom edge of the insulated glass unit.
Figure 13:
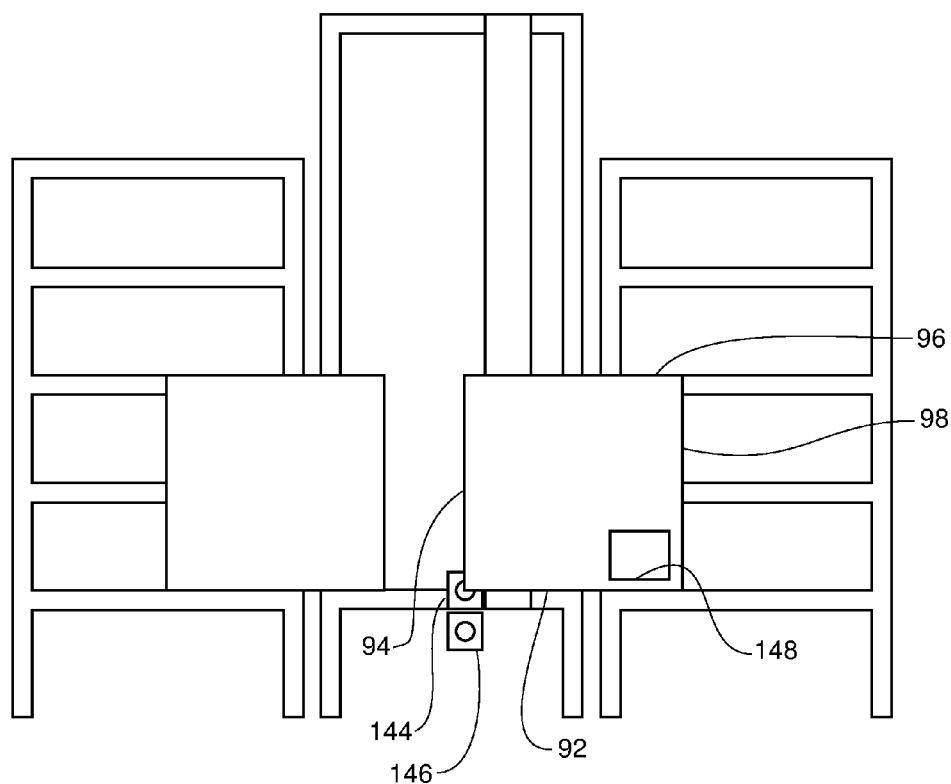
FIG. 13 is a schematic depiction of a dual head IGU secondary sealer as the first sealing head applies secondary sealant to a trailing edge of an insulated glass unit and a second sealing head disengages from the bottom edge of the insulated glass unit.

Servo driven cup 90 supports suction cups configured to selectively grip spacer applied lite 78. Such suction cups are generally conventional and need not be further described here to those of ordinary skill in the art. As best seen in FIG. 4, servo driven cup 90 is configured to grip spacer applied lite 78 and advance it slightly prior to the beginning of application to permit the staging of a following spacer applied lite 78 while a perimeter spacer is applied to the leading spacer applied lite 78.

IGU spacer applicator 62 generally also includes vertical support 104 in addition to front conveyor 100 and rear conveyor 102.

Referring particularly to FIGS. 3-8, according to an example embodiment of the invention, spacer is applied while spacer applied lite 78 is moving forward. Thus, applicator head 86 and applicator gantry 88 are configured to follow spacer applied lite 78 as it is conveyed forward and to apply spacer while spacer applied lite 78 is being conveyed forward.

According to an example embodiment of the invention, movement of applicator head 86, applicator gantry 88 and servo driven cup 90 are coordinated with each other so that spacer is applied first to bottom edge 92 of spacer applied lite 78 followed by trailing edge 94 of spacer applied lite 78 then top edge 96 and leading edge 98 in sequence while spacer applied lite 78 travels forward. Accordingly, applicator head 86 first travels backward relative to the motion of spacer applied lite 78 to apply spacer bottom edge 92 of spacer then upward to apply spacer to trailing edge 94 then forward relative to spacer applied lite 78 to apply spacer to top edge 96. Applicator head 86 then travels downward along leading edge 96 to complete spacer application around the perimeter of spacer applied lite 78. All the while spacer applied lite 78 travels forward on the assembly line.

According to an example embodiment of the invention, applicator head 86 then rotates in a clockwise direction while returning to apply spacer to a following spacer applied lite 78.

Driven grid station 66 is generally conventional in design and includes grid applicator 106. Driven grid station 66 is generally conventional in design and need not be further described here.

Gas press and fill station 70 according to example embodiments of the invention may include double gas press 108 or single gas press 110.

Figure 14:
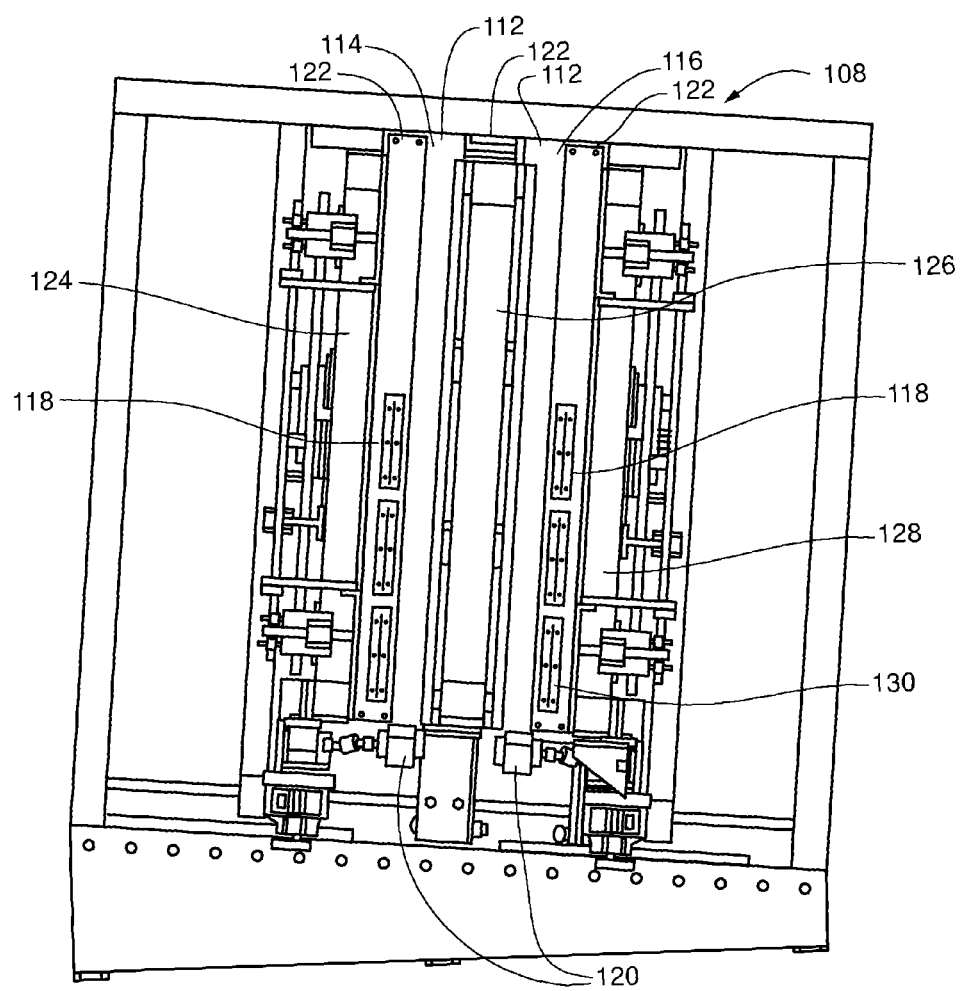
FIG. 14 is an elevational view of a double gas press according to an embodiment of the invention.

According to an example embodiment, depicted in FIG. 14, double gas press 108 includes two gas press compartments 112 including front gas press compartment 114 and rear gas press compartment 116. Each of front gas press compartment 114 and rear gas press compartment 116 include gas ducts 118 and internal conveyor 120.

Double gas press 108 generally includes three platens 122. Platens 122 include front platen 124, central platen 126 and back platen 128. Each of the three platens 122 includes suction grippers (not depicted) on at least one surface thereof. According to an example embodiment of the invention, front platen 124 includes suction grippers (not depicted) on one surface thereof while central platen 126 includes suction grippers on two surfaces thereof and back platen 128 includes suction grippers on one surface thereof.

Double gas press 108 includes gas supply 130 as well. Front gas press compartment 114 and rear gas press compartment 116 are configured to open and close to accept spacer applied lites 78 and topping lites 80. Double gas press 108 is configured so that front gas press compartment 114 and rear gas press compartment 116 shuttle back and forth to align with front conveyor 100 and rear conveyor 102.

Front platen 124 is configured to be movable back and forth relative to central platen 126 to open and close front gas compartment 114 while also bringing spacer applied lite 78 into close proximity to topping lite 80 for mating. Rear gas press compartment 116 is configured so that back platen 128 and central platen 126 may be moved relative to each other in a similar fashion.

According to another example embodiment depicted in FIG. 15, single gas press 110 generally includes housing 132 enclosing front platen 134 and back platen 136. Housing 132 further includes side doors 138, internal conveyor 140 and gas ducts 142. Single gas press 110 is structured to travel or shuttle forward and back between front conveyor 100 and rear conveyor 102. Front platen 134 is movable relative to back platen 136. Gas ducts 142 may be located below, at the leading edge or at the trailing edge of single gas press 110. Side doors 138 are configured to open and close to contain gas therein and exclude atmospheric gas during the gas filling process.

If gas ducts 142 are located below the location at which spacer applied lites 78 are received, gas ducts may be configured to withdraw and advance while internal conveyor 140 is withdrawn and advanced to permit gas filling. For example, gas ducts 142 and internal conveyor 140 can be mutually coupled and movable perpendicular to their long axis.

Referring to FIGS. 9-13, according to an example embodiment, secondary edge sealer 72 generally includes first edge sealing head 144, second edge sealing head 146, servo driven cup 148, and gantry 150.

According to an example embodiment of the invention, first edge sealing head 144 is supported by gantry 150. Second edge sealing head 146 is separately located at a lower edge of where insulated gas units that have been gas filled and pressed pass through secondary edge sealer 72. According to an example embodiment of the invention, first edge sealing head 144 travels on gantry 140 to apply secondary edge sealant to leading edge 98, top edge 96 and trailing edge 94 of insulated glass units. Second edge sealing head 146 applies secondary edge sealant to bottom edge 92 of insulated glass units. According to an example embodiment of the invention, servo driven cups 148 grip and transport the insulated glass unit forward. It is notable that according to the present invention, insulated glass units never travel backwards on the conveyor line but always move forward. This is also true of spacer applied lites 78 as spacers are applied to them. Servo driven cups 148 are configured to displace the insulated glass unit forward to permit staging of a following insulated glass unit 78 while the first unit is being edge sealed.

According to an example embodiment of the invention, each of the first edge sealing heads 144 and lower second edge sealing heads 146 includes first corner wiper 152 and second corner wiper 154 that eliminate or minimize the need for operator touch-up of insulated glass units. First corner wiper 152 is coupled to first edge sealing head 144 while second corner wiper 154 is coupled to second edge sealing head 146.

Having been secondary edge sealed the insulated glass unit is conveyed from secondary edge sealer 72 to non-driven outfeed queue station 74.

Non-driven outfeed queue station 74 is generally conventional in design and need not be further described here.

According to another embodiment of the invention, the invention includes a method of manufacturing insulated glass units. According to an embodiment of the invention, the method includes receiving glass lites at infeed station 52; conveying the glass lites to washer 54; washing and drying the glass lites in washer 54; conveying the glass lites to an inspection station 56 and further conveying the glass lites to shuttle 58. The method may include shuttling alternate lites to front conveyor line 82 and rear conveyor line 84 and shuttle 58 and distributing spacer applied lites 78 to front conveyor line 82 and distributing topping lites 80 to rear conveyor line 84. The method may then include conveying spacer applied lites 78 and topping lite 80 through infeed conveyor 60 to IGU spacer applicator 62.

The method may further include applying IGU spacer to spacer applied lite 78 while spacer applied lite 78 is constantly moving forward or at least never being moved backward. The method may further include applying spacer to spacer applied lite 78 first, along bottom edge 92, second, along trailing edge 94, third, along top edge 96 and fourth, along leading edge 98. The method further includes conveying spacer applied lite 78 from IGU spacer applicator 62 to following queue station 64.

The method also includes optionally applying grids at driven grid station 66.

According to another embodiment, the method includes conveying spacer applied lite 78 and topping lite 80 via second queue station 68 to gas press and fill station 70.

According to one embodiment of the invention, the method further includes gas filling and applying topping lite 80 to spacer applied lite 78 in double gas press 108.

The method further includes in another embodiment applying topping lite 80 to spacer applied lite 78 and gas filling in single gas press 110.

A method according to an embodiment of the invention includes mating topping lite 80 with spacer applied lite 78 in a double gas press. In this embodiment of the invention, alternate insulated glass units are assembled in a front gas compartment 114 and a rear gas compartment 116 of double gas press 108.

According to another embodiment of the invention, the method further includes mating topping lite 80 with spacer applied lite 78 and gas filling in single gas press 110.

According to another embodiment of the invention, the method further includes conveying an insulated glass unit from double gas press 108 or single gas press 110 to secondary edge sealer 72. The method further includes secondary edge sealing of the insulated glass unit by first edge sealing head 144 and second edge sealing head 146. The method further includes sealing in sequence leading edge 98, top edge 96, and trailing edge 94 of the insulated glass unit with first edge sealing head 144 while simultaneously sealing bottom edge 92 with second edge sealing head 146. The method according to the invention further includes conveying the insulated glass unit with servo driven cup 148 during the edge sealing process. The method may further include secondary edge sealing the insulated glass unit while continuously moving the insulated glass unit forward in the conveying process.

In operation, glass lites are fed into high speed parallel manufacturing line 50 at infeed station 52. Glass lites are conveyed to washer 54 where they are washed and dried. Glass lites are then conveyed to inspection station 56 for inspection. Then glass lites are conveyed to shuttle 58 which places alternate glass lites on front conveyor 100 or rear conveyor 102. Spacer applied lites 78 are transported on front conveyor 100 while topping lites 80 are transported on rear conveyor 102. Spacer applied lites 78 are then transported to IGU spacer applicator 62 where spacer is applied first to bottom edge 92, then to trailing edge 94, then to top edge 96 and finally to leading edge 98. Spacer is applied while the spacer applied lite 78 is moving forward on the conveyor line. Spacer applied lite 78 and topping lite 80 are then transported via following queue station 64 optionally to driven grid station 66 and then to second queue station 68. Spacer applied lites 78 and topping lites 80 are then conveyed to gas press and fill station 70 which according to alternate embodiments of the invention may include double gas press 108 or single gas press 110. In either case, topping lites 80 are transferred to the front of the gas press and fill station 70 and are mated with spacer applied lite 78 while gas filling takes place. This creates an insulated glass unit that has been primarily sealed. The insulated glass unit is then transported to secondary edge sealer 72 which applies secondary edge sealant via two edge sealing heads including first edge sealing head 144 and second edge sealing head 146. First edge sealing head 144 applies secondary sealant to leading edge 98, top edge 96 and trailing edge 94 of the insulated glass unit in that sequence. Simultaneously, second edge sealing head 146 applies secondary edge sealant to bottom edge 92. During the secondary edge sealing process, edge sealant is wiped at the corners by first corner wiper 152 and second corner wiper 154. Completed insulated glass units having been secondarily edge sealed are then conveyed to non-driven outfeed queue station 74.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

The invention claimed is:

1. A parallel manufacturing line for manufacturing insulated glass units, the manufacturing line comprising:
    a front conveyor system;
    a back conveyor system operating in parallel with the front conveyor system;
    a shuttle mechanism at least a portion of which is shiftable between a first position proximate the front conveyor system and a second position proximate the back conveyor system that distributes glass lites to the front conveyor system and the back conveyor system;
    an insulated glass unit spacer applicator having a spacer dispensing head configured to apply perimeter spacer material to at least one of the glass lites, the spacer head being proportionally movable relative to at least one of the glass lites as the at least one glass lite is conveyed forwardly on one of the front conveyor system and the back conveyor system to apply the perimeter spacer material to create a spacer applied lite and such that the at least one glass lite is moved forward without backward movement on the during spacer application;
    a gas press and seal mechanism having at least one front platen and one back platen that mates the spacer applied lite from one of the front conveyor system and the back conveyor system with a topping lite from another of the front conveyor system and the back conveyor system to create an insulated glass unit; and
    a secondary edge sealing unit having a first secondary edge sealing head and a second secondary edge sealing head, each of the first secondary edge sealing head and the second secondary edge sealing head applying edge sealant to a portion of a perimeter of the insulated glass unit wherein the gas press and seal mechanism further comprises a second shuttle that shifts at least a portion of the gas press and seal mechanism between a front position proximate the front conveyor and a back position proximate the back conveyer system.

2. The parallel manufacturing line as claimed in claim 1, wherein the insulated glass unit spacer applicator applies perimeter spacer material first to a bottom edge of the at least one glass lite, followed by a trailing edge of the at least one glass lite, the top edge of the glass lite and then to a leading edge of the at least one glass lite.

3. The parallel manufacturing line as claimed in claim 1, wherein the first secondary edge sealing head applies the edge sealant to a leading edge of the spacer applied lite, an upper edge of the spacer applied lite and a trailing edge of the insulated glass unit.

4. The parallel manufacturing line as claimed in claim 1, wherein the first secondary edge sealing head applies the edge sealant first, to a leading edge of the spacer applied lite, second to an upper edge of the spacer applied lite and third to a trailing edge of the insulated glass unit in sequence.

5. The parallel manufacturing line as claimed in claim 3, wherein the second secondary edge sealing head applies the edge sealant to a bottom edge of the insulated glass unit.

6. The parallel manufacturing line as claimed in claim 1, wherein the gas press and seal mechanism comprises a single gas press.

7. The parallel manufacturing line as claimed in claim 6, wherein the single gas press further comprises a housing enclosing the front platen and the back platen and further comprising side doors and gas ducts.

8. A parallel manufacturing line for manufacturing insulated glass units the manufacturing line comprising: a front conveyor system: a back conveyor system operating in parallel with the front conveyor system: a shuttle mechanism that distributes glass lites to the front conveyor system and the back conveyor system: an insulated glass unit spacer applicator having a spacer dispensing head configured to apply perimeter spacer material to at least one of the glass lites, the spacer head being proportionally movable relative to the at least one glass lite as the at least one glass lite is conveyed forwardly on one of the front conveyor system and the back conveyor system to apply the perimeter spacer material to create a spacer applied lite and such that the at least one glass lite is moved forward during the spacer application: a gas press and seal mechanism having at least one front platen and one back platen that mates the spacer applied lite from one of the front conveyor system and the back conveyor system with a topping lite from another of the front conveyor system and the back conveyor system to create an insulated glass unit: and wherein the gas press and seal mechanism includes a single gas press that further comprises a shuttle whereby the single gas press is moved between the front conveyor system and the back conveyor system and receives the spacer applied lites from one of the front conveyor system and the back conveyor system and the topping lite from the other of the front conveyor system and the back conveyor system.

9. The parallel manufacturing line as claimed in claim 6, wherein the first secondary edge sealing head is movably supported on a gantry that moves the first secondary edge sealing head in at least x and y directions.

10. The parallel manufacturing line as claimed in claim 1, wherein the insulated glass unit spacer applicator further includes an applicator servo driven cup that grips the at least one glass lite and conveys the at least one glass lite forward in coordination with the spacer dispensing head while the perimeter spacer material is applied.

11. The parallel manufacturing line as claimed in claim 10, wherein the at least one glass lite comprises a first glass lite and a second glass lite, wherein the applicator servo driven cup moves the first glass lite forward a short distance at the insulating glass unit spacer during spacer application to make available space for the staging of the second glass lite.

12. The parallel manufacturing line as claimed in claim 1, wherein the secondary edge sealing unit further includes an edge sealer servo driven cup that grips the insulated glass unit and conveys the insulated glass unit forward in coordination with the first secondary edge sealing head and the second secondary edge sealing head while the edge sealant is applied.

13. The parallel manufacturing line as claimed in claim 10, wherein the insulating glass unit further comprises a first insulating glass unit and a second insulating glass unit, wherein the edge sealer servo driven cup moves the first insulated glass unit forward a short distance at the secondary edge sealing unit during edge sealing to make available space for staging of the second insulated glass unit.

* * * * *